(12) United States Patent
Steuer et al.

(10) Patent No.: US 11,507,442 B2
(45) Date of Patent: Nov. 22, 2022

(54) METHOD AND SYSTEM FOR DETERMINING MATURITY LEVEL OF A CLOUD COMPUTING SERVICE

(71) Applicant: ServiceNow, Inc., Santa Clara, CA (US)

(72) Inventors: Rotem Steuer, Modin (IL); Oded Tsur, Maccabim (IL); Shlomi Sividia, Ganei Tikva (IL); Arik Sityon, Ganney Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 488 days.

(21) Appl. No.: 16/573,822

(22) Filed: Sep. 17, 2019

(65) Prior Publication Data
US 2021/0081267 A1 Mar. 18, 2021

(51) Int. Cl.
*G06F 11/07* (2006.01)
*G06F 16/2457* (2019.01)
*G06F 11/30* (2006.01)
*G06F 11/34* (2006.01)
*H04L 67/01* (2022.01)

(52) U.S. Cl.
CPC ........ *G06F 11/0709* (2013.01); *G06F 11/076* (2013.01); *G06F 11/301* (2013.01); *G06F 11/3055* (2013.01); *G06F 11/3409* (2013.01); *G06F 16/2457* (2019.01); *H04L 67/01* (2022.05)

(58) Field of Classification Search
CPC ............. G06F 11/0709; G06F 16/2457; G06F 11/076; G06F 11/301; G06F 11/3055; G06F 11/3409; H04L 67/42
See application file for complete search history.

(56) References Cited

U.S. PATENT DOCUMENTS

| | | |
|---|---|---|
| 6,321,229 B1 | 11/2001 | Goldman et al. |
| 6,609,122 B1 | 8/2003 | Ensor |
| 6,678,987 B2 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher et al. |
| 7,020,706 B2 | 3/2006 | Cates |
| 7,027,411 B1 | 4/2006 | Pulsipher et al. |
| 7,028,301 B2 | 4/2006 | Ding |
| 7,062,683 B2 | 6/2006 | Warpenburg |
| 7,131,037 B1 | 10/2006 | LeFaive |

(Continued)

*Primary Examiner* — Elias Desta
(74) *Attorney, Agent, or Firm* — Fletcher Yoder PC (57) ABSTRACT

Systems and methods are disclosed that evaluate maturity or readiness of services of a cloud infrastructure client instance. Service maturity may be defined based on certain predetermined maturity criteria, which may evaluate certain corresponding service parameters of the service, such as a software component status of a service, a hardware component status of the service, and/or an error status of the service. In some embodiments, the definition of service maturity may be customized by a user. For example, the user may adjust, add, or remove the maturity criteria. The systems and methods may determine the service parameters of the service, and determine the maturity of the service by applying the maturity criteria to the determined service parameters. The service maturity may then be output (e.g., displayed or sent) to the user.

20 Claims, 6 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | Shum |
| 7,392,300 B2 | 6/2008 | Anantharangachar et al. |
| 7,610,512 B2 | 10/2009 | Gerber |
| 7,617,073 B2 | 11/2009 | Trinon et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,945,860 B2 | 5/2011 | Vambenepe et al. |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangarajan et al. |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueeler |
| 9,412,084 B2 | 9/2016 | Kowalski |
| 9,467,344 B2 | 10/2016 | Gere |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,795,901 B2 * | 10/2020 | Tolani ............... G06F 16/24578 |
| 10,985,934 B2 * | 4/2021 | Shribman ........... H04L 12/4633 |
| 2021/0263779 A1 * | 8/2021 | Haghighat ........... G06F 9/5061 |

\* cited by examiner

METHOD AND SYSTEM FOR DETERMINING MATURITY LEVEL OF A CLOUD COMPUTING SERVICE

BACKGROUND

The present disclosure relates generally to services of a cloud infrastructure client instance and, more particularly, to evaluating maturity or readiness of the services.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A cloud infrastructure client instance may store and/or execute a variety of services. Each service may include a number of software applications and hardware components. However, each service may exist in a certain, possibly distinct, stage of its life cycle. For example, the service may be in development, ready for testing, ready for execution, have components that are not operable, be reliable, be complete, and so on.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are disclosed that evaluate maturity or readiness of services of a cloud infrastructure client instance. Service maturity may be defined based on certain predetermined maturity criteria, which may evaluate certain corresponding service parameters of the service, such as a software component status of a service, a hardware component status of the service, and/or an error status of the service. In some embodiments, the definition of service maturity may be customized by a user. For example, the user may adjust, add, or remove the maturity criteria. The systems and methods may determine the service parameters of the service, and determine the maturity of the service by applying the maturity criteria to the determined service parameters. The service maturity may then be output (e.g., displayed or sent) to the user.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "logic" as used herein may include software (e.g., machine-readable instructions), hardware (e.g., circuitry), or a combination of the two.

A cloud infrastructure based client instance may store and/or execute a variety of services. Examples of services include web applications, load balanced web server environment systems, travel websites and accompanying infrastructure, web services, mobile services, database management systems, networking services, database applications, message-broker software, messaging platforms, console services, and so on. Each service may include a number of software applications and hardware components (e.g., servers, computing devices, routers, and networking components). However, each service may exist in a certain, possibly distinct, stage of its life cycle. For example, the service may be in development, ready for testing, ready for execution, have components that are not operable, be reliable, be complete, and so on. Service maturity may be defined based on certain predetermined maturity criteria, which may evaluate certain corresponding service parameters of the service, such as a software component status of a service, a hardware component status of the service, and/or an error status of the service. In some embodiments, the definition of service maturity may be customized by a user. For example, the user may adjust, add, or remove the maturity criteria. The service parameters of the service may be determined, and, subsequently, the maturity of the service may be determined by applying the maturity criteria to the determined service parameters. The service maturity may then be output (e.g., displayed or sent) to the user.

Figure 1:
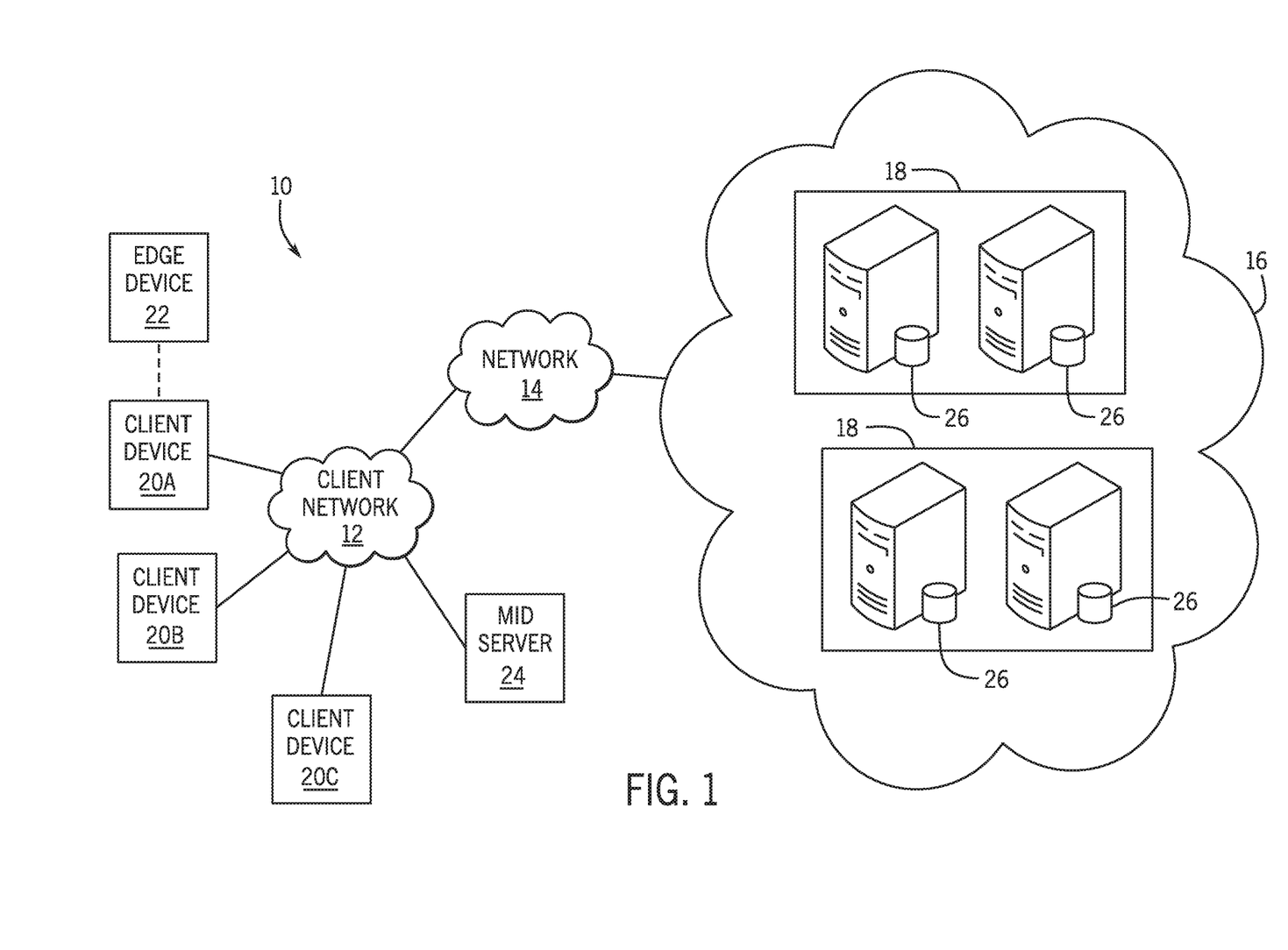
FIG. 1 is a block diagram of an embodiment of a cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
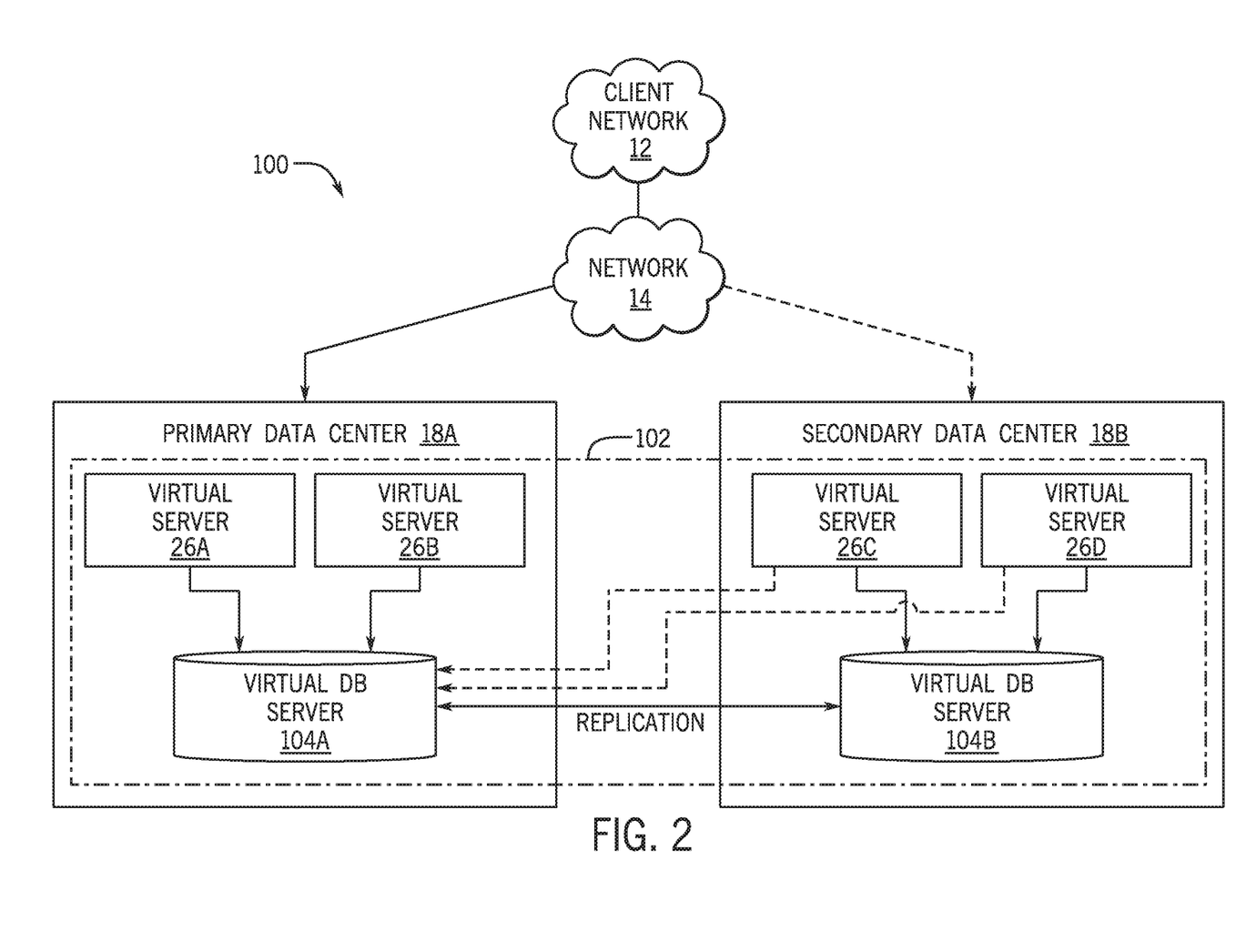
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
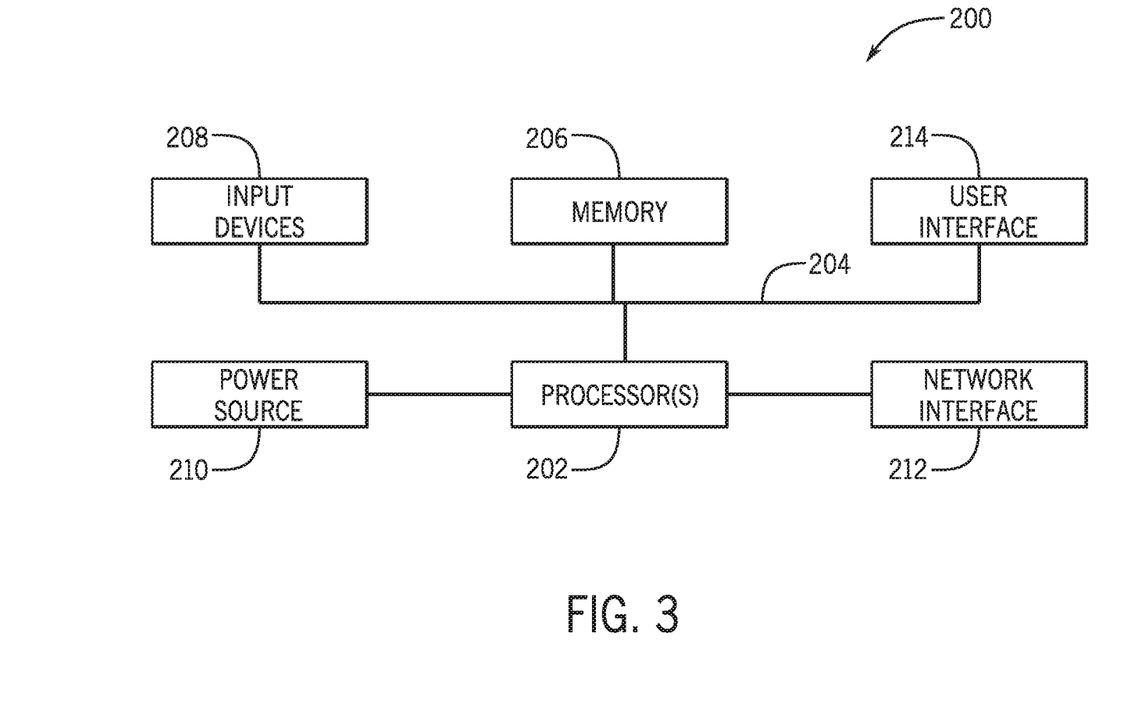
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
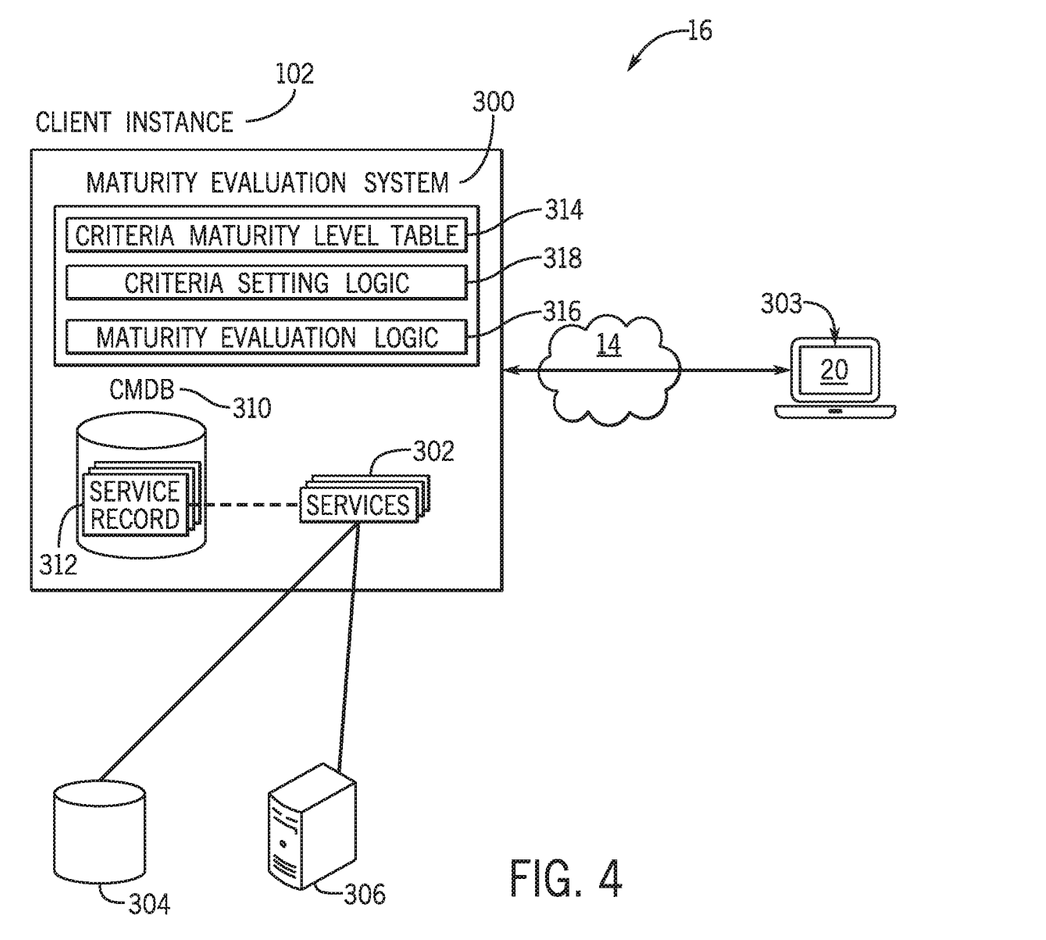
FIG. 4 is a block diagram of a maturity evaluation system enabled by a client instance in a cloud-based platform, according embodiments of the present disclosure.

With the preceding in mind, FIG. 4 is a block diagram of a maturity evaluation system 300 enabled by the client instance 102 in the cloud-based platform 16, according to embodiments of the present disclosure. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). As such, the maturity evaluation system 300 may determine maturity levels of services 302 stored and/or executed on the client instance 102 and output the maturity levels to (e.g., a display 303 of) the client device 20.

The client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. For example, the maturity evaluation system 300 may determine maturity levels of services 302 stored and/or executed on the client instance 102 and output the maturity levels via the application that is executed within the web browser.

A service 302 may include a set of interconnected software components 304 (e.g., software applications and database applications) and hardware components 306 (e.g., network hosts, servers, routers, networking devices, and computing devices) that deliver a desired product or perform a desired function for a user/customer. Examples of services 302 include web applications, load balancers, web server environment systems, travel websites and accompanying infrastructure, database management systems, database applications, message-broker software, messaging platforms, or any other suitable combination of software and hardware components that provide a desired product or perform a desired function.

The client instance 102 may include a configuration management database (CMDB) 310 that manages the services 302 by storing service records 312 corresponding to the services 302. The service records 312 may include identification information, configurations, settings, attributes, descriptions, and/or any other suitable information associated with the services 302. That is, a service record 312 serves as a representation of an actual or "physical" service 302. For example, a service record 312 for a service 302 may include identification information associated with the service 302, identification information associated with a software component 304 that facilitates providing the service 302, and identification information associated with a hardware component 306 that facilitates providing the service 302.

The maturity evaluation system 300 may determine a maturity level or rating of a service 302 of the client instance 102. The maturity evaluation system 300 may include a criteria-maturity level table 314 that stores relationship between maturity criteria and maturity levels. The criteria-maturity level table 314 may include any suitable data structure that may store relationships between maturity criteria and maturity levels, such as a database table. The maturity criteria may evaluate any parameter or characteristic of the service 302 that may be relevant to determining maturity of the service 302. For example, the service parameters may include a status of a software component 304, a status of a hardware component 306, an error status of the service 302, and so on.

As such, a maturity criterion may include whether a software component 304 of the service 302 is functioning as expected and/or is of a current or desired version or release. As another example, a maturity criterion may include whether a hardware component 306 of the service 302 is functioning as expected and/or is in an operational state. As yet another example, a maturity criterion may include whether a number of active errors reported on the service 302 is within threshold range active errors, whether a number of resolved errors reported on the service 302 is within threshold range resolved errors, or whether a number of errors of a specific type reported on the service 302 is within a threshold range of errors of the specific type, and the like.

Maturity levels may be provided in the form of a scale of any suitable range using any suitable units. For example, the scale may be binary and indicate whether a service is 302 is mature or immature. In some embodiments, the scale may indicate a level of maturity, providing more depth of understanding as to the maturity of the service 302. That is, the scale may be a percentage range, a fractional range, a ratio, a numerical range between 1-10, 0-10, 1-100, 1-5, 0-5, 0-3, and so on, wherein the lowest number of the range may indicate a lowest level of maturity, and the highest number of the range may indicate a highest level of maturity, or vice versa. As yet another example, the scale may use letter grades, such as A-F or A-Z, wherein the lowest number of the range may indicate a lowest level of maturity, and the highest number of the range may indicate a highest level of maturity, or vice versa.

The criteria-maturity level table 314 may store expressions, formulas, and/or equations that relate evaluation of the maturity criteria to the maturity levels, and maturity evaluation logic 316 may apply the maturity criteria to the service 302 and apply the criteria-maturity level table 314 to the result to determine the maturity level of the service 302. The maturity evaluation logic 316 may evaluate maturity criteria (e.g., as set by criteria setting logic 318) on software components 304 and hardware components 306 of the services 302, and apply the relationships stored in the criteria-maturity level table 314 to determine the maturity levels of the services 302. For example, the criteria-maturity level table 314 may relate a maturity criterion that categorizes a software component 304 of a service 302 as mature when the software component 304 is functioning as expected, and immature when the software component 304 is not functioning as expected. The maturity evaluation logic 316 may apply the maturity criteria to the software components 304 of the service 302 to determine whether the software components 304 are functioning as expected, and apply the criteria-maturity level table 314 to the result to determine the maturity level of the service 302.

In another example, the criteria-maturity level table 314 may relate a maturity criterion that categorizes a number of active errors reported on the service 302 within a first threshold range of active errors as a first maturity level, within a second threshold range of active errors as a second maturity level, within a third threshold range of active errors as a third maturity level, and so on. The maturity evaluation logic 316 may apply the maturity criteria to the active errors reported on the service 302 to determine whether the number of active errors are within the first threshold range, the second threshold range, the third threshold range, and so on, an apply the criteria-maturity level table 314 to the result to determine the maturity level of the service 302.

Similarly, the criteria-maturity level table 314 may relate a maturity criterion that categorizes a number of errors of a specific type (e.g., loading errors, runtime errors, connection errors, or unexpected result errors) reported on the service 302 within a first threshold range of errors of the specific type as a first maturity level, within a second threshold range of errors of the specific type as a second maturity level, within a third threshold range of errors of the specific type as a third maturity level, and so on. The maturity evaluation logic 316 may apply the maturity criteria to the errors of the specific type reported on the service 302 to determine whether the number of errors of the specific type are within the first threshold range, the second threshold range, the third threshold range, and so on, an apply the criteria-maturity level table 314 to the result to determine the maturity level of the service 302.

Moreover, the maturity evaluation logic 316 may apply weight to different types of maturity criteria to determine the maturity level of the service 302. For example, a software maturity criterion that categorizes whether a software component 304 of a service 302 is functioning as expected may be used to determine a software maturity level of the service 302 as defined by the criteria-maturity level table 314. The criteria-maturity level table 314 may define the software maturity level as a numerical value. An active error maturity criterion that categorizes a number of active errors (e.g., errors that have not been resolved) reported on the service 302 may be used to determine an active error maturity level of the service 302 as defined by the criteria-maturity level table 314. The criteria-maturity level table 314 may also define the active error maturity level as a numerical value.

The maturity evaluation logic 316 may apply a first weight (e.g., a software maturity weight) to the software maturity level to determine a weighted software maturity level, apply a second weight (e.g., an active error weight) to the active error maturity level to determine a weighted active error maturity level, and combine (e.g., sum) the weighted software maturity level and the weighted active error maturity level to determine the maturity level of the service 302. For example, the software maturity weight may be 80% and the active error weight may be 20%, such that summing the weighted software maturity level and the weighted active error maturity level will result in a maximum maturity level of 100%. It should be understood that any number of suitable types of maturity criterion and any variation of suitable weights may be used to determine the maturity level of the service 302.

The criteria setting logic 318 may define the maturity criteria that are applied to determine a maturity level of a service 302. For example, the criteria setting logic 318 may define that the maturity level of a service 302 is determined wholly on whether the software component 304 of a service 302 is functioning as expected. The criteria setting logic 318 may also define the scale of the maturity levels (e.g., a binary range, a percentage scale, a fractional scale, a numerical scale, or a letter grade scale). The criteria setting logic 318 may further define any weights applied to each maturity criterion used to determine the maturity level of a service 302 based on weighting software components 304 and/or hardware components 306 of the service 302.

In some embodiments, the criteria setting logic 318 may be predefined to define a default set of maturity criteria (e.g., that may include a default weighting scheme) that determines the maturity level of the service 302. Moreover, the criteria setting logic 318 may enable dynamic setting of the maturity criteria and/or weights of the maturity criteria. For example, the maturity evaluation system 300 may present a user interface on the display 303 of the client device 20 that enables a user to adjust, enter, or delete maturity criteria and/or weights of the maturity criteria via the network 14. As such, users of the maturity evaluation system 300 may define how maturity is evaluated on a service 302.

Figure 5:
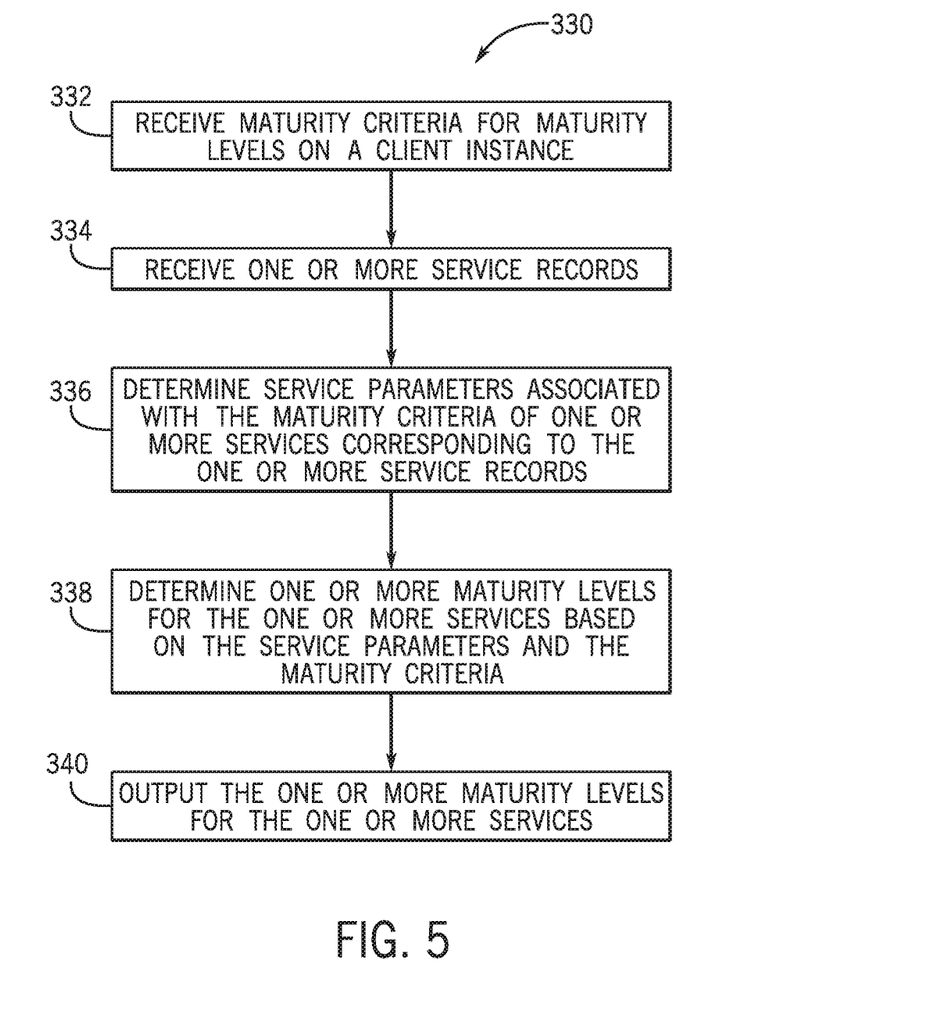
FIG. 5 is a flow diagram illustrating a process for determining a maturity level of a client service, according to embodiments of the present disclosure.

With the foregoing in mind, FIG. 5 is a flow diagram illustrating a process 330 for determining a maturity level of a client service 302, according to embodiments of the present disclosure. The process 330 may be performed, for example, by the maturity evaluation system 300 of FIG. 4, and, more particularly, the maturity evaluation logic 316, and/or the criteria setting logic 318. While the process 330 is described using steps in a specific sequence, it should be understood that the present disclosure contemplates that the describe steps may be performed in different sequences than the sequence illustrated, and certain described steps may be skipped or not performed altogether.

In process block 332, the criteria setting logic 318 receives maturity criteria for maturity levels on a client instance 102. In particular, a user may set maturity criteria and/or weights of the maturity criteria via, for example, a user interface provided on a display 303 of the client device 20 via the network 14. The criteria setting logic 318 may write the maturity criteria and/or the weights of the maturity criteria to the criteria-maturity level table 314.

In process block 334, the maturity evaluation logic 316 receives one or more service records 312 corresponding to one or more services 302 stored and/or executing on the client instance 102. The service records 312 may be stored in the configuration management database (CMDB) 310. Service records 312 may serve as representations of actual or "physical" services 302. In some cases, a service record 312 may be provided based on a user selecting a service 302 corresponding to the service record 312 (e.g., in order to to view information, including the maturity level, of the service 302). In other cases, multiple service records 312 may be provided based on, for example, a user desiring to view metrics of multiple services 302 corresponding to the service records 312.

In process block 336, the maturity evaluation logic 316 determines service parameters associated with the maturity criteria of one or more services 302 corresponding to the one or more service records 312. That is, the maturity criteria may evaluate certain corresponding service parameters of the service 302, such as a software component status of a service 302, a hardware component status of the service 302, and/or an error status of the service 302. The maturity evaluation logic 316 determines those service parameters, such as each software component status of each software component 304 of the service 302, each hardware component status of each hardware component 306 of the service 302, each error status of each error of the service 302, and so on. The service parameters that correspond to the maturity criteria may be determined based on the relationships stored in the criteria-maturity level table 314. For example, a maturity criterion may define a maturity level of a service 302 based on categorizing the number of active errors reported on the service 302 within threshold ranges of active errors. As such, the service parameter that corresponds to the example maturity criterion may be the number of active errors.

In some embodiments, the service parameters of each service 302 may be stored as part of the corresponding service record 312 in the CMDB 310. In additional or alternative embodiments, the maturity evaluation logic 316 may analyze and determine the software components 304, the hardware components 306, the errors, and so on, of each service 302, and determine the service parameters based on the determined software components 304, the hardware components 306, the errors, and so on.

In process block 338, the maturity evaluation logic 316 determines maturity levels for the services 302 based on the service parameters and the maturity criteria. In particular, the maturity evaluation logic 316 may apply the maturity criteria to the determined service parameters of a service 302 to determine the maturity level of the service 302. The maturity criteria may be stored in the criteria-maturity level table 314. For example, a maturity criterion may define a maturity level of a service 302 as "0" when the number of active errors reported on the service 302 is greater than 20 errors in a time range (e.g., in the last week), "1" when the number of active errors reported on the service 302 is within 10-20 errors in the time range, "2" when the number of active errors reported on the service 302 is within 5-10 errors in the time range, and "3" when the number of active errors reported on the service 302 is within 0-4 errors in the time range. As such, if the number of active errors (e.g., the service parameter) of the service 302 within the time range is 7 errors, the maturity evaluation logic 316 determines that the maturity level for the service 302 is "1".

In process block 340, the maturity evaluation logic 316 outputs the maturity levels for the services 302. For example, the maturity level may be output to a user interface displayed on the display 303 of the client device 20 via the network 14. In some embodiments, if the maturity level is "immature" or below a threshold maturity level, the client instance 102 may enable reporting of the low maturity level. That is, a user may view information related to a service 302 that includes a low maturity level. As such, the user may submit a report, for example, to an information technology department or management team, to alert the information technology department or management team that the service 302 is immature.

Moreover, in some cases, the user may be seeking information about the service 302, and the maturity level may be displayed as a portion of the information (e.g., including identification information, status, users, client names, software components 304, hardware components 306, and errors) displayed associated with the service 302. In other cases, the user may be seeking metrics of a variety of services, and the metrics may include maturity levels for the variety of services.

Figure 6:
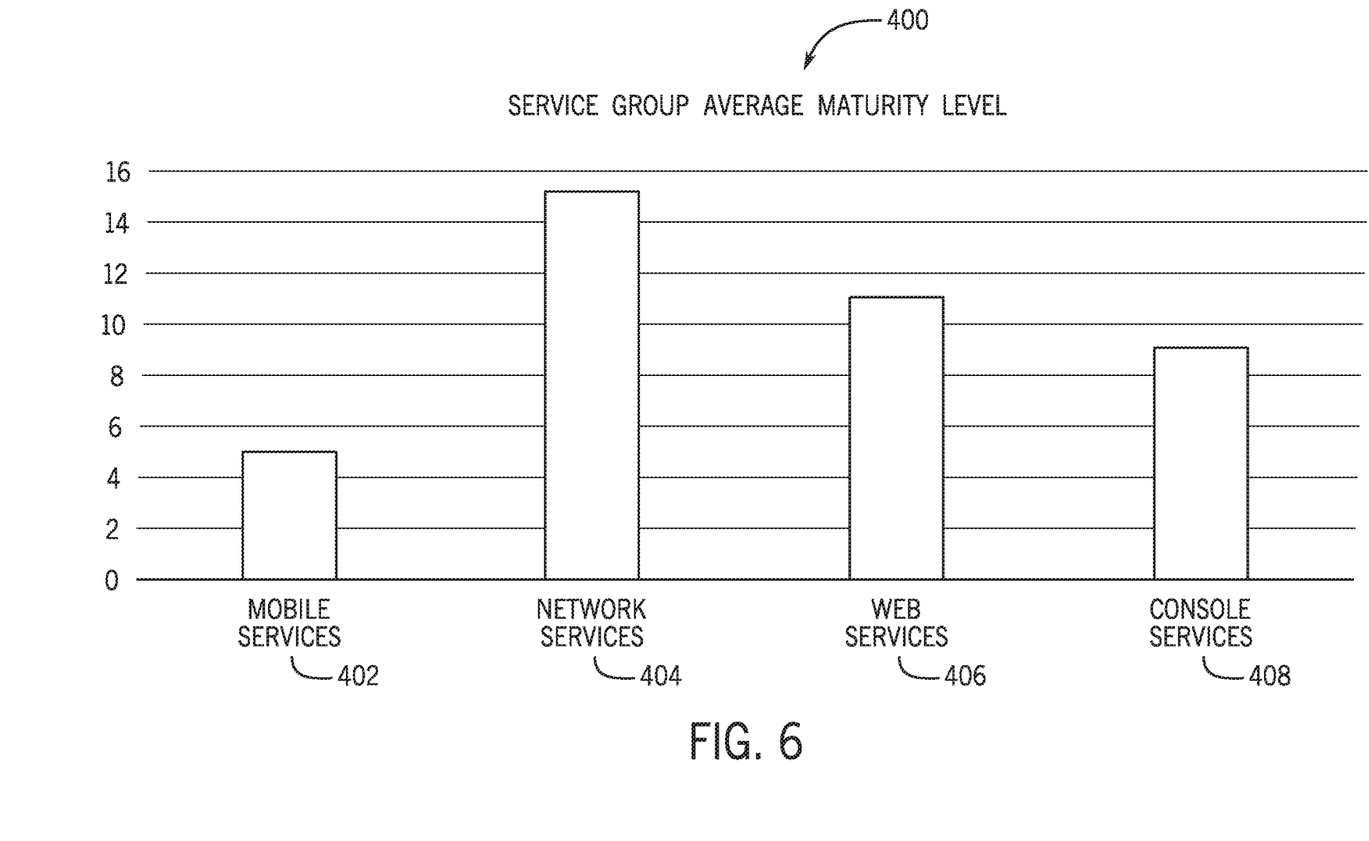
FIG. 6 is a user interface that displays average maturity ratings or levels for service groups, according to embodiments of the present disclosure.

For example, FIG. 6 is a user interface 400 that displays average maturity ratings or levels for service groups, according to embodiments of the present disclosure. The services 302 of the client instance 102 may be organized into service groups, such as mobile services 402, network services 404, web services 406, and console services 408. The user interface 400 may provide a quick and convenient way for a user to view maturity levels or ratings of service groups of the client instance 102, and the ability to determine which service groups are more mature (e.g., and ready to test, publish, and/or release), and which are not.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
   one or more data centers;
   a client instance hosted by the one or more data centers, wherein the client instance is accessible by one or more remote client networks, wherein the client instance is configured to implement maturity evaluation logic; and
   a user interface enabled by the client instance that facilitates providing a cloud computing service to a client device;
   wherein the maturity evaluation logic is configured to:

receive one or more maturity criteria associated with a maturity level of the cloud computing service;

receive a service record corresponding to the cloud computing service;

determine one or more service parameters of the cloud computing service associated with the one or more maturity criteria; and determine the maturity level of the cloud computing service based on the one or more service parameters and the one or more maturity criteria.

2. The cloud computing system of claim 1, wherein the cloud computing service comprises a software component, wherein the one or more maturity criteria relates the maturity level to a status of the software component.

3. The cloud computing system of claim 2, wherein the one or more service parameters of the cloud computing service comprise the status of the software component.

4. The cloud computing system of claim 2, wherein the maturity level comprises an indication that the cloud computing service is mature or immature based on the status of the software component.

5. The cloud computing system of claim 1, comprising criteria setting logic configured to adjust the one or more maturity criteria.

6. The cloud computing system of claim 1, wherein the one or more maturity criteria are configured to be provided by default.

7. The cloud computing system of claim 1, wherein the maturity evaluation logic is configured to store one or more relationships between the one or more maturity criteria and the maturity level in a criteria-maturity level table.

8. The cloud computing system of claim 1, wherein the client instance is configured to output the maturity level to the client device via the one or more remote client networks.

9. The cloud computing system of claim 1, wherein the client instance facilitates providing a plurality of cloud computing services to the client device, wherein the plurality of cloud computing services comprises the cloud computing service, wherein the user interface is configured to display a plurality of maturity levels of the plurality of cloud computing services, wherein the plurality of maturity levels comprises the maturity level.

10. A tangible, non-transitory, machine-readable-medium, comprising machine-readable instructions that, when executed by a processor, cause the processor to:

receive a plurality of maturity criteria associated with a plurality of maturity levels of a plurality of cloud computing services configured to be provided by a client instance hosted by one or more data centers;

receive a plurality of service records corresponding to the plurality of cloud computing services;

determine a plurality of service parameters of the plurality of cloud computing services associated with the plurality of maturity criteria; and determine a respective maturity level of the plurality of maturity levels for each cloud computing service of the plurality of cloud computing services based on the plurality of service parameters and the plurality of maturity criteria.

11. The tangible, non-transitory, machine-readable-medium of claim 10, wherein a maturity criterion of the plurality of maturity criteria relates a maturity level of the plurality of maturity levels to a status of a hardware component of a cloud computing service of the plurality of cloud computing services.

12. The tangible, non-transitory, machine-readable-medium of claim 11, wherein the maturity level comprises an indication that the cloud computing service is mature or immature based on the status of the hardware component.

13. The tangible, non-transitory, machine-readable-medium of claim 12, wherein the machine-readable instructions cause the processor to enable reporting on the cloud computing service if the service is immature.

14. A method, comprising:

receiving one or more maturity criteria associated with a plurality of maturity levels of one or more cloud computing services configured to be provided by a client instance of a cloud computing system, wherein the client instance is hosted by one or more data centers;

receiving one or more service records corresponding to the one or more cloud computing services;

determining one or more service parameters of the one or more cloud computing services associated with the one or more maturity criteria; and determining a respective maturity level of the plurality of maturity levels for each cloud computing service of the one or more cloud computing services based on the one or more service parameters and the one or more maturity criteria.

15. The method of claim 14, wherein a maturity criterion of the one or more maturity criteria relates a maturity level of the plurality of maturity levels to an error status of a cloud computing service of the one or more cloud computing services, wherein the one or more service parameters of the cloud computing service comprise the error status of the cloud computing service.

16. The method of claim 15, wherein the maturity level comprises an indication that the cloud computing service is mature or immature based on the error status of the cloud computing service.

17. The method of claim 15, wherein the error status of the cloud computing service is associated with a number of errors reported on the cloud computing service, wherein the method comprises determining the respective maturity level for each cloud computing service by determining that the number of errors is within a range of errors of a plurality of ranges of errors.

18. The method of claim 15, wherein the error status of the cloud computing service is associated with an active number of errors reported on the cloud computing service, wherein the method comprises determining the respective maturity level for each cloud computing service by determining that the number of active errors is within a range of active errors of a plurality of ranges of active errors.

19. The method of claim 15, wherein the one or more maturity criteria comprises a software component status of the cloud computing service and a hardware component status of the cloud computing service.

20. The method of claim 19, comprising determining the maturity level of the cloud computing service by applying a first weight to the error status to generate a weighted error maturity level, applying a second weight to the software component status to generate a weighted software maturity level, applying a third weight to the hardware component status to generate a weighted hardware maturity level, and combining the weighted error maturity level, the weighted software maturity level, and the weighted hardware maturity level.

* * * * *